(12) United States Patent
Naoi

(10) Patent No.: US 6,947,041 B2
(45) Date of Patent: Sep. 20, 2005

(54) IMAGE PROCESSING METHOD

(75) Inventor: Junichi Naoi, Tokyo (JP)

(73) Assignee: Sony Computer Entertainment Inc. (JP)

(*) Notice: Subject to any disclaimer, the term of this patent is extended or adjusted under 35 U.S.C. 154(b) by 375 days.

(21) Appl. No.: 10/165,282

(22) Filed: Jun. 7, 2002

(65) Prior Publication Data
US 2002/0190983 A1 Dec. 19, 2002

(30) Foreign Application Priority Data

Jun. 8, 2001 (JP) .................. 2001-174030
May 9, 2002 (JP) .................. 2002-133585

(51) Int. Cl.$^7$ .................. G06T 15/00
(52) U.S. Cl. .................. 345/428; 345/419
(58) Field of Search .................. 345/423, 428, 345/419, 426, 619

(56) References Cited

U.S. PATENT DOCUMENTS 5,719,598 A * 2/1998 Latham .................. 345/419
5,838,332 A 11/1998 Penna et al.
5,977,983 A * 11/1999 Einkauf et al. .................. 345/582
6,246,414 B1 6/2001 Kawasaki

FOREIGN PATENT DOCUMENTS

| JP | 05-073259 A | 3/1993 |
| JP | 9212654 | 8/1997 |
| JP | 10-511203 A | 10/1998 |

* cited by examiner

Primary Examiner—Phu K. Nguyen
(74) Attorney, Agent, or Firm—Lerner, David, Littenberg, Krumholz & Mentlik, LLP

(57) ABSTRACT

The size of polygons for composing an object in computer graphics is compared with a predetermined threshold value. Each polygon not exceeding the threshold value is directly converted into pixels. On the other hand, each polygon having a size which exceeds the threshold value is divided, and the resultant polygons are compared again. This ensures efficient processing of the polygons without causing an expansion of the circuit configuration or a significant increase in cost. The processing of the polygons will never be affected by the size of the polygons.

8 Claims, 7 Drawing Sheets

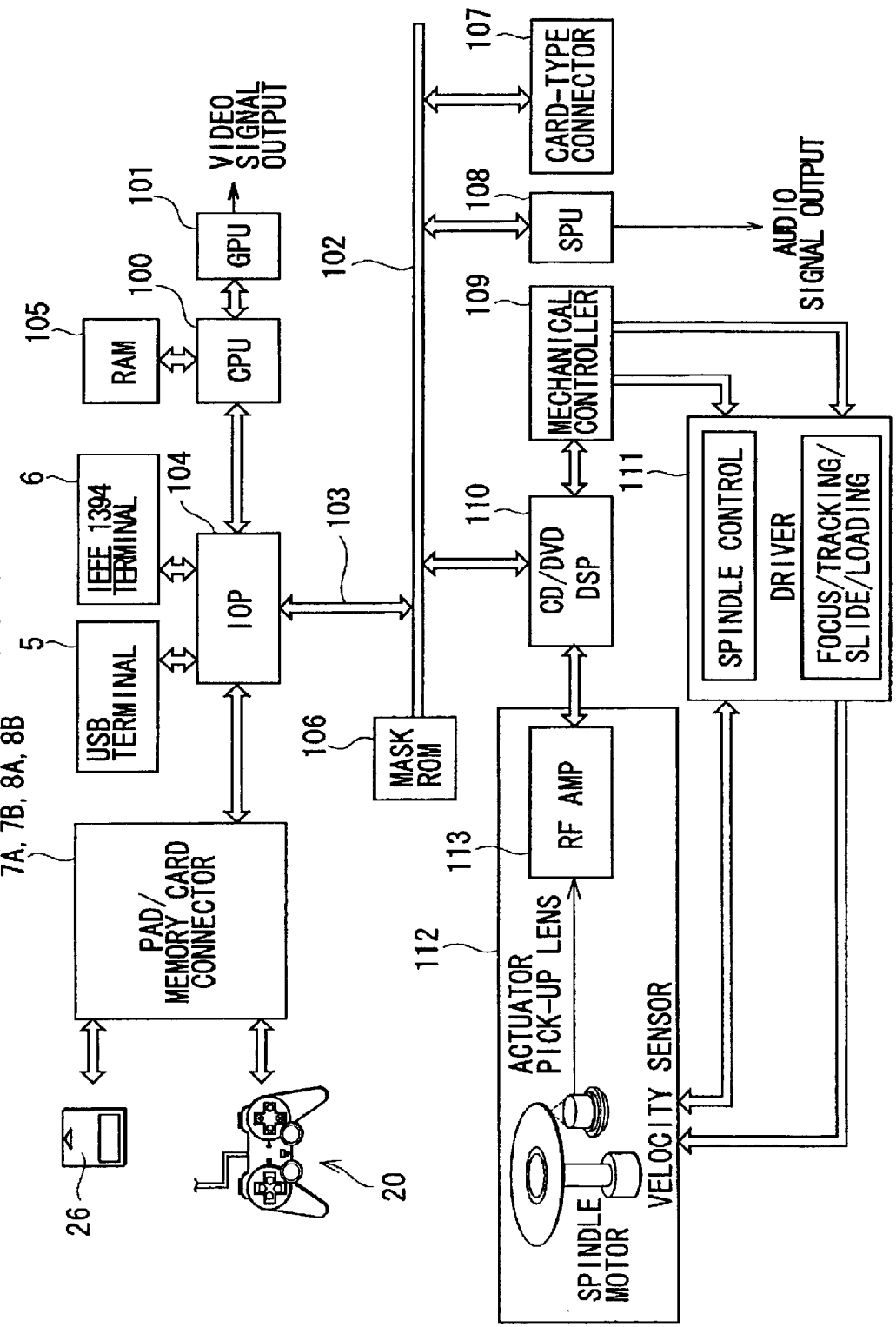

IMAGE PROCESSING METHOD

CROSS-REFERENCE TO RELATED APPLICATIONS

This application claims priority from Japanese Patent Application No. 2001-174030 filed on Jun. 8, 2001 and No. 2002-133585 filed on May 9, 2002, the disclosures of which are hereby incorporated by reference herein.

BACKGROUND OF THE INVENTION

The present invention relates to an image processing method for generating, from three-dimensional image information, two-dimensional image information to be drawn on a two-dimensional screen, such as on a television monitor device, and also relates to a device used therefor, a recording medium having recorded thereon an image processing program, and such image processing program.

There are accelerating trends in higher integration and faster processing speed of processors and memories in recent television game consoles and personal computers, so that an image processing device composed of such a game console or personal computer can generate, from a three-dimensional image, a fine two-dimensional image with real presence in a real-time manner and can display it on two-dimensional monitor screens.

Most current image processing systems generate two-dimensional images according to draw processing on a polygon basis. Reasons why the current image processing systems employ polygon-based draw processing in the generation of two-dimensional images are that polygon data which are expressed on the basis of apexes of polygons are easy to control; that conversion of polygon data to pixel data can be achieved by linear interpolation of apexes onto a draw screen and thus memory access and operations can have locality which is enough to raise the processing speed; and that most of the operations can simply be done by addition if the linear interpolation is performed by using a DDA (digital differential analyzer) so that a sufficiently effective level of real-time drawing can be achieved even with a circuit scale currently available.

Generation processing of two-dimensional images as viewed from the aspect of data type transition is as follows.

First, polygon data on the world coordinate system are subjected to geometry calculations including coordinate conversion, clipping and lighting processing. The polygon data obtained after such geometry calculations are then subjected to projection conversion to be converted into polygon data on screen coordinates. The polygon data on the screen coordinates are subjected to rendering to be converted into pixel data (pixel conversion) on the screen. The pixel data are further converted into screen data to be displayed on a two-dimensional screen. The screen data are sent to a television monitor device and displayed as a two-dimensional image on the two-dimensional screen.

It should now be noted that polygon data have an apex basis, and on the other hand, pixel data have a pixel basis. That is, these two sets of data differ in their units of processing. As a result, conversion of the polygon data into pixel data often causes a delay in the data processing and inefficient operation of calculation circuits. More specifically, rendering is a process directly affected by the area of the polygons, so that pixel conversion for a larger polygon will take a longer process time, and for a smaller polygon a shorter process time. On the contrary, geometry calculation and projection conversion are calculation processes on the apex basis irrespective of the polygon area, so that these calculations take almost the same length of time both for larger polygons and smaller polygons. This means that, for an example in which a larger polygon is drawn first and a smaller polygon comes next, geometry calculation and projection conversion for the smaller polygon are forcibly halted until pixel conversion for the larger polygon by rendering is finished.

The recent mainstream of calculation circuits for rendering is such that a plurality of polygons are generated per one process cycle for a single polygon, where the number of such pixels is fixed depending on the hardware. On the other hand, smaller polygons often come short of the fixed number of pixels even after rendering. An increase in the number of small polygons coming short of the fixed number of pixels will lower the process efficiency of the calculation circuit, and thus decrease the pixel fill rate.

According to these matters, the size of polygons that an image processing system can process on a draw screen in the most efficient manner is almost uniquely decided by the circuit constitution that is used for geometry calculation, setup processing, and rendering processing (pixel conversion), the performance ratio (performance difference) thereof, etc. Conventional image processing systems are configured to draw relatively larger polygons effectively. In other words, conventional image processing systems cannot process polygons effectively other than polygons which have a size for effective processing.

On the other hand, it is supposed that drawing models will become very complicated and that rendering processing will have more variety in the future. If drawing models become very complicated and rendering processing has more variety, it can be predicted that polygons will inevitably become smaller; that the number of small polygons will increase remarkably; and that the number of parameters for the apex of a polygon will increase. Further, according to these results, it can be predicted that the image processing system should lower the pixel fill rate greatly.

As mentioned above, in order to process a large number of small polygons effectively, the image processing system should fix pixel conversion processing and raise throughput of polygons. Further, in order to raise pixel fill rate, the image processing system should draw larger polygons simultaneously. However, it is difficult for conventional image processing systems to perform both high-speed processing for a large number of small polygons and raising of the pixel fill rate at the same time, in order to satisfy the two demands mentioned above. Efforts to satisfy the two demands will make an image processing system have a large number of expensive and large DDAs, which is unpractical in view of cost and circuit scale.

SUMMARY OF THE INVENTION

The present invention was proposed to address the foregoing problems. In that regard, the present invention provides an image processing method capable of processing a large number of small polygons with a high efficiency without causing an expansion of the circuit constitution or a significant increase in the cost, and raises the pixel fill rate without being affected by the size of the polygons. The present invention also provides a device used therefor, a recording medium having recorded thereon an image processing program, and such image processing program.

According to the present invention, the size of each polygon is compared with a predetermined threshold value, the longest edge of each triangular polygon having a size which exceeds the threshold value is detected, each of the triangular polygons having a size which exceeds the threshold value is then divided with a line segment connecting a predetermined point on such longest edge and an apex opposed to such longest edge; and each polygon having a size which does not exceed the threshold value is converted into pixels. Especially, the predetermined point is the middle point of the longest edge.

That is, according to the present invention, each polygon that exceeds the threshold value is divided by a line segment connecting a middle point of the longest edge and an apex opposed to the longest edge. And this division processing is performed repeatedly until the size of each polygon is reduced to within the range of the predetermined value. The predetermined value corresponds to a calculation range for pixel conversion, for example. In other words, according to the present invention, calculations for pixel conversion are limited so as to be small in degree so that the constitution for pixel conversion can be miniaturized, which makes it easier to increase the amount of parallel processing. And at the same time, according to the present invention, the repeated division is performed so as to reduce polygons that exceed the predetermined value into polygons in a small calculation range suitable for executing pixel conversion. Thus, the present invention can reduce every size of polygons to a size suitable for the calculation range of pixel conversion by repeatedly dividing polygons having a size that exceeds the predetermined value. Further, the present invention can raise the throughput of polygons and increase the pixel fill rate greatly by performing pixel conversion in parallel.

BRIEF DESCRIPTION OF THE DRAWINGS

FIG. 9 is a block diagram showing a specific configuration of pixel conversion processing applied to the graphic processor unit (GPU) of a video game console.

DETAILED DESCRIPTION

An outline of pixel conversion processing for polygons according to the present invention will be explained referring to FIG. 1.

In one case of producing a two-dimensional image from three-dimensional image information, there are a few large polygons Pl and a large number of small polygons Ps. The number of small polygons Ps is supposed to increase if the model to be drawn is more precise. It is expected that the performance of the pixel conversion process can be raised by properly reducing the calculation range (process bit length in the pixel conversion) in accordance with the small polygons Ps and by further conducting such process in a parallel manner. However, if the calculation range is set in accordance with the small polygons Ps, large polygons Pl that exceed the calculation range can not be processed.

According to an embodiment of the present invention, the calculation range is limited to a properly reduced level, and polygons which fall within such calculation range (small polygons Ps) will directly be subjected to-the pixel conversion. On the other hand, polygons which exceed such calculation range (large polygons Pl) will be divided (polygon division processing D) until the resultant polygons fall within such calculation range. The pixel conversion is conducted for the small polygons Ps and the resultant small polygons Pd obtained by the division processing D. This ensures efficient pixel conversion for every size of polygons with a minimum waste of time. And, as the calculation range is limited to a properly reduced level, the pixel conversion can be realized by a simplified small constitution and is easy for parallel processing.

Further, in the present embodiment, as explained later, a polygon is divided with a line segment which connects a predetermined point on the longest edge thereof and an apex opposed to such longest edge, and such division is repeatedly carried out to thereby approximately equalize the three edges of the polygon and to set the size of the polygons to a size suitable for the calculation range of pixel conversion.

In other words, the image processing device according to the present embodiment reduces the burden of pixel conversion and increases the multiplicity of the parallel processing by limiting the calculation range of pixel conversion to a reduced level. Further, the image processing device according to the present embodiment ensures efficient pixel conversion with a minimum waste of time and increases the pixel fill rate by dividing large polygons Pl into small polygons Ps having a size which is suitable for the calculation range of pixel conversion and performing parallel pixel conversion PX.

Exemplary Constitution

Figure 2:
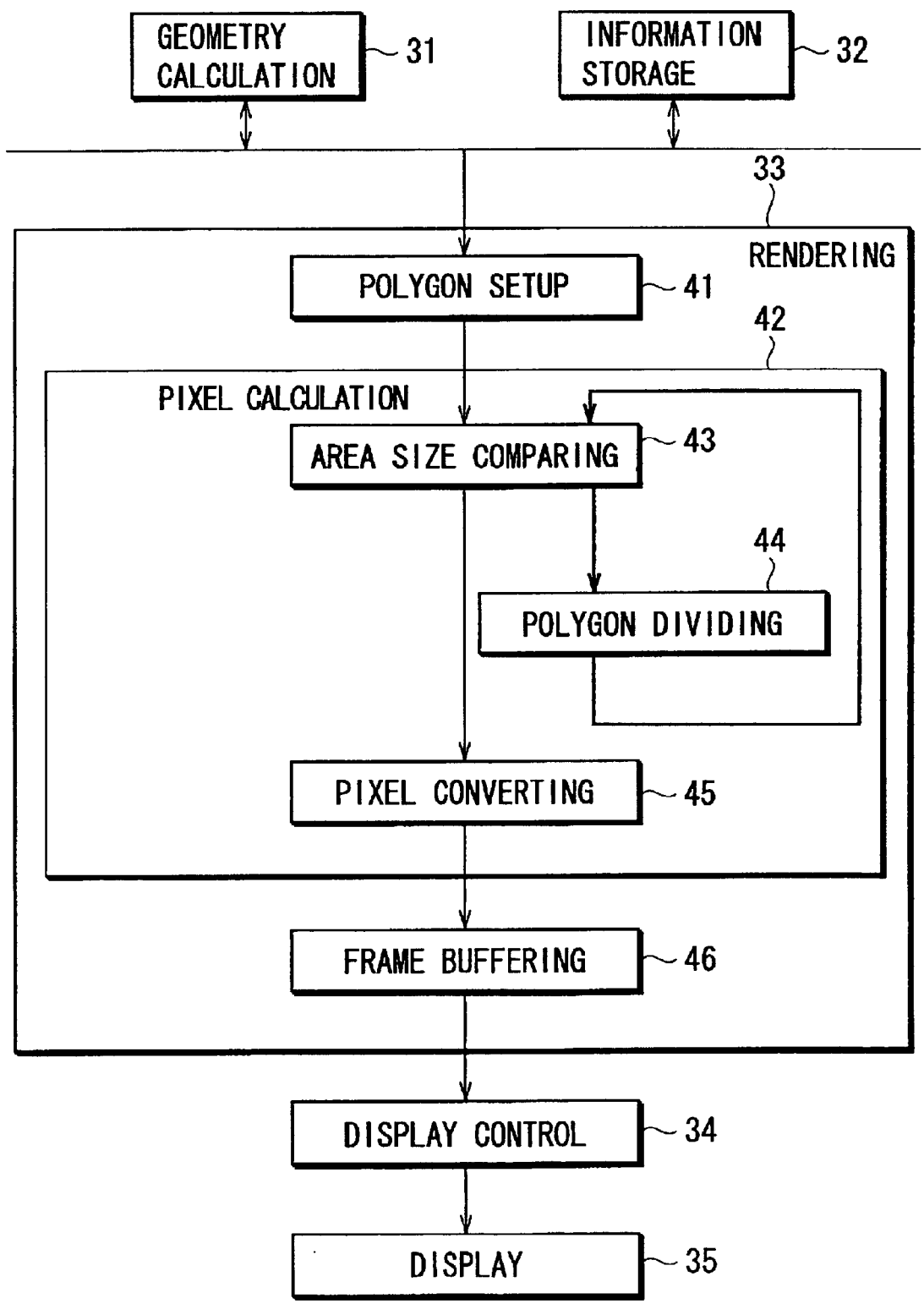
FIG. 2 is a block diagram explaining a process for pixel conversion using a digital signal processor (DSP) or graphic processor (GP), or on a software basis.

FIG. 2 shows a specific example of a process according to which the pixel conversion is conducted. The pixel conversion can be effected by a hardware arrangement including a Digital Signal Processor (DSP) or Graphic Processor (GP), or by using software (computer-executable application program). FIG. 2 shows internal processing units of the DSP and GP responsible for the pixel conversion. For the case in which the pixel conversion is carried out on a software basis, the application program will contain program steps corresponding to the individual constituents shown in FIG. 2. The CPU of an information processing device such as a personal computer operates based on such application program.

In FIG. 2, an information storage section 32 stores graphic information such as polygons (apex information or apex-linked information such as coordinate values for apexes, RGB apex color values, map coordinate values and vector values). The graphic information herein is previously captured as read out from various recording media, such as a CD-ROM, DVD-ROM or a semiconductor memory, or as downloaded through communication or transmission media based on line or radio communication.

A geometry calculating section 31 retrieves stored graphic information from the information storage section 32, and then subjects the retrieved graphic information to so-called affine transformation, projection conversion onto a screen coordinate, and light source processing for the apexes. The graphic information after the projection conversion (polygon data) is sent to a rendering section 33.

The rendering section 33 is responsible for calculation for displaying polygons on the screen, and converts polygon data received from the geometry calculating section 31 into pixels. The rendering section 33 can roughly be divided into a polygon setup section 41, a pixel calculating section 42 and a frame buffering section 46.

The polygon setup section 41 is responsible for retrieving and buffering polygon data received from the geometry calculating section 31, converting the polygon mesh structure such as that having a strip form or fan form into independent polygons, and sending the results to the pixel calculating section 42. The polygon setup section 41 is also responsible for discarding unnecessary polygons by area culling or back culling. Such discarding of unnecessary polygons is provided to raise the efficiency of processes executed by the succeeding pixel calculating section 42.

The pixel calculating section 42 is responsible for division processing for large polygons according to the calculation range explained above with reference to FIG. 1 and for the parallel processing of pixel conversion. The pixel calculating section 42 comprises an area size comparing section 43, a polygon dividing section 44 and a pixel converting section 45.

The pixel calculating section 42 first feeds polygon data received from the polygon setup section 41 to the area size comparing section 43. The area size comparing section 43 determines whether the received polygons fall within a calculation range, and then sends data regarding the polygons which were found to fall within the calculation range to the pixel converting section 45, and sends data regarding those exceeding such range to the polygon dividing section 44. The specific constitution and operations of the area size comparing section 43 will be described later.

The polygon dividing section 44 typically halves a polygon exceeding the calculation range to thereby reconstruct it into two polygons. Data of thus divided two polygons are then sent to the area size comparing section 43, where they are assessed for their sizes again. If the halved polygons are found to still exceed the calculation range, the polygon diving section 44 again halves the polygons. That is, the polygon dividing section 44 converts the large polygon PI into small polygon Pd which falls within the calculation range by repeatedly dividing the polygons which exceed the calculation range. The specific constitution and operations of the polygon dividing section 44 will be described later.

Data of the polygons falling within the calculation range after the division or from the beginning are then sent from the area size comparing section 43 to the pixel converting section 45.

The pixel converting section 45 converts the polygon data into raster data, or pixel data (color values of the individual pixels), and then sends the results to the frame buffering section 46. The pixel converting section 45 herein generates the color values of the individual pixels by interpolating apex color values of the polygon data or acquiring the map coordinate values. The x-axis calculation range and y-axis calculation range of pixel converting section 45 are set to the same value and the converting section 45 is constituted by a plurality of parallel processing units which limit the calculation range to a reduced level. In other words, the pixel converting section 45 is simply constituted by making no difference between the calculation range of the x-axis and the y-axis and limiting the calculation range to a reduced level. Further, the pixel converting section 45 is constituted to increase the multiplicity of the parallel processing so as to perform efficient processing.

The frame buffering section 46 writes the color values of the individual pixels in a memory space corresponding to a display (screen) 35 of a television monitor device or the like. The screen data by frames thus generated in the memory space is read out when requested by a display control section 34.

The display control section 34 generates horizontal synchronizing signals and vertical synchronizing signals of the television monitor device, and also serially retrieves pixel color values from the frame buffering section 46 in a line-feed manner in synchronization with the display timing on the monitor. Thus, retrieved color values compose a two-dimensional image which will be displayed on the display 35, such as television monitor device.

Detailed Operations and Constitution of the Area Size Comparing Section

Figure 3:
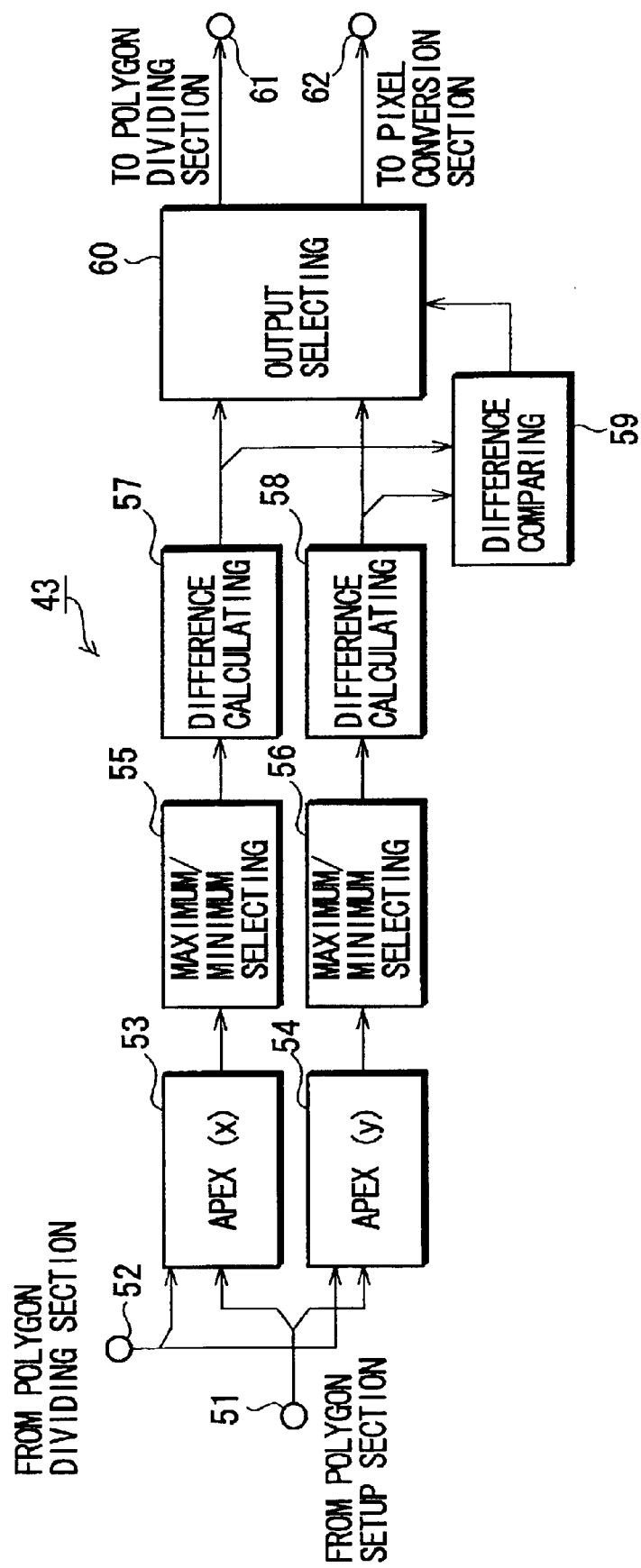
FIG. 3 is a block diagram explaining a process for comparing area sizes.
Figure 4:
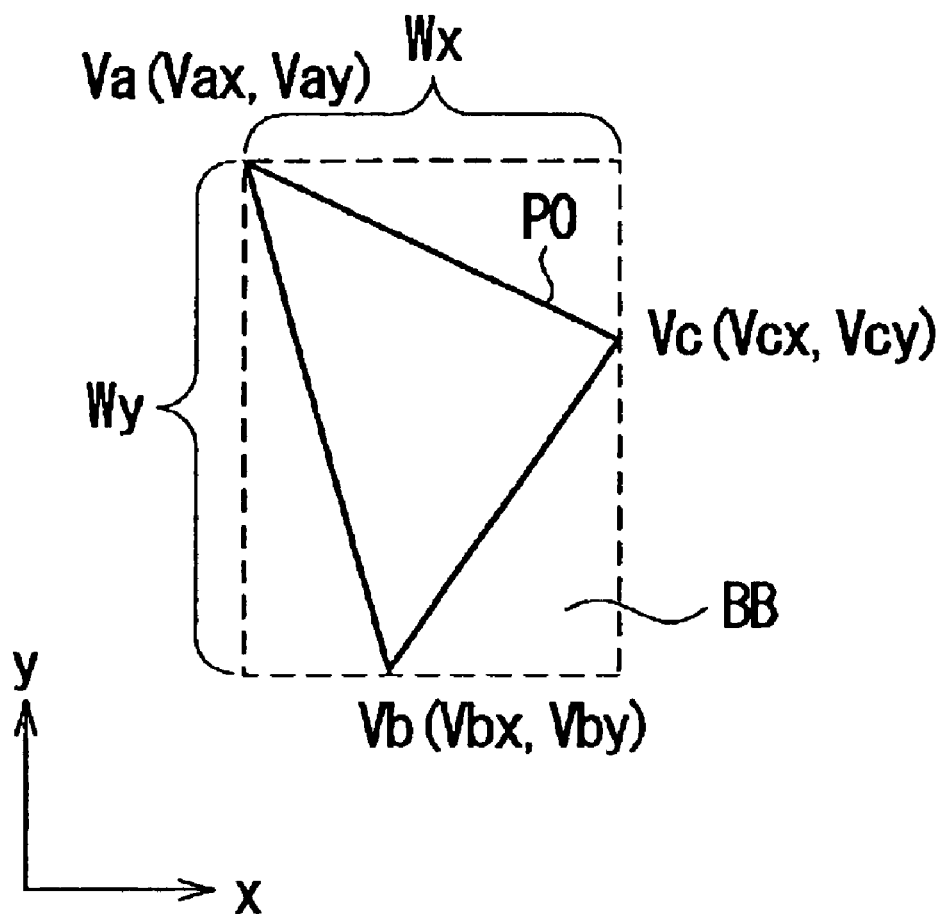
FIG. 4 is a drawing showing an example of a triangular polygon used for explaining the process for comparing area sizes.

The next paragraphs will detail the operations and constitution of the area size comparing section 43 with reference to FIGS. 3 and 4. The following description mainly deals with information flow related to the determination of whether a polygon falls within the calculation range or not, and alteration (selection) of the destination for the data to be sent to depending on the result of such determination.

As shown in FIG. 3, the polygon data received from the polygon setup section 41 is fed to an input section 51 of the area size comparing section 43. On the other hand, the polygon data received from the polygon dividing section 44 is fed to an input section 52.

Assuming now that the fed polygon is a triangular polygon P0 having apex coordinate values of Va(Vax, Vay), Vb(Vbx, Vby) and Vc(Vcx, Vcy) as shown in FIG. 4. An apex coordinate section 53 retrieves x coordinate values Vax, Vbx and Vcx from the individual apex coordinate values of the triangular polygon P0. On the other hand, an apex coordinate section 54 retrieves y coordinate values Vay, Vby and Vcy from the individual apex coordinate values of the triangular polygon P0. Such x coordinate values Vax, Vbx, Vcx and y coordinate values Vay, Vby Vcy are sent, together with the fed polygon data, to maximum/minimum selecting sections 55, 56 respectively corresponding thereto.

The maximum/minimum selecting section 55 determines a maximum x coordinate value Vxmax and a minimum x coordinate value Vxmin from x coordinate values Vax, Vbx, Vcx according to equations (1) and (2) below:

$$Vxmax = max(Vax, Vbx, Vcx) \qquad (1)$$

$$Vxmin = min(Vax, Vbx, Vcx) \qquad (2)$$

The maximum/minimum selecting section 56 determines a maximum y coordinate value Vymax and a minimum y coordinate value Vymin from y coordinate values Vay, Vby, Vcy according to equations (3) and (4) below:

$$Vymax = max(Vay, Vby, Vcy) \qquad (3)$$

$$Vymin = min(Vay, Vby, Vcy) \qquad (4)$$

In the example shown in FIG. 4, Vcx will be the maximum x coordinate value Vxmax, Vax will be the minimum x coordinate value Vxmin, Vay will be the maximum y coordinate value Vymax, and Vby will be the minimum y coordinate value Vymin. The maximum and minimum coordinate values determined by the maximum/minimum selecting sections 55, 56 correspond to offset coordinate components of the triangular polygon P0 on the screen coordinate.

The maximum x coordinate value Vxmax, the minimum x coordinate value Vxmin, the maximum y coordinate value Vymax and the minimum y coordinate value Vymin are sent, together with the fed polygon data, to corresponding difference calculating sections 57, 58, respectively.

The difference calculating section 57 calculates the difference between the maximum x coordinate value Vxmax and the minimum x coordinate value Vxmin according to the equation (5) below. That is, the difference calculating section 57 assumes a square (boundary box BB expressed by the broken line in FIG. 4) containing all apexes of the triangular polygon P0, and finds the length Wx of an edge thereof in the x-axis direction. It is to be noted now that the top and bottom edges of the boundary box BB lie parallel to the x axis of the screen, and the lateral edges thereof lie parallel to the y axis of the screen.

$$Wx=Vx\text{max}-Vx\text{min} \quad (5)$$

The difference calculating section 58 calculates the difference between the maximum y coordinate value Vymax and the minimum y coordinate value Vymin according to the equation (6) below. That is, the difference calculating section 58 finds the edge length Wy of the boundary box BB in the y-axis direction.

$$Wy=Vy\text{max}-Vy\text{min} \quad (6)$$

According to the constitution shown in FIG. 3, the maximum and minimum coordinate values are determined by the maximum/minimum selecting sections 55, 56, differences of both are calculated by the difference calculating sections 57, 58, and the fed polygon data is expressed by an offset and such differences, whereby the bit length of the data to be used in the succeeding pixel conversion will be minimized. This is advantageous in relieving the succeeding pixel converting section 45 from an excessive calculation load, and simplifying the circuit constitution.

The edge lengths Wx, Wy calculated by the difference calculating sections 57, 58, respectively, are sent to a difference comparing section 59. The polygon data passed through the difference calculating sections 57, 58 is then sent to an output selecting section 60.

The difference comparing section 59 compares the edge lengths Wx, Wy with a predetermined threshold value range, which corresponds to the calculation range, using the equation (7) shown below, and sends the compared result to the output selecting section 60. More specifically, when either of the edge lengths Wx, Wy exceeds the threshold value range, the difference comparing section 59 sends a signal expressing such situation to the output selecting section 60, and when both of the edge lengths Wx, Wy fall within the threshold value range, the difference comparing section 59 sends another signal expressing such situation to the output selecting section 60.

The output selecting section 60 then makes a selection whether the polygon data should be sent from an output section 61 to the polygon dividing section 44, or from output section 62 to the pixel converting section 45 depending on the compared result obtained by the difference comparing section 59 using the equation (7). More specifically, when either of the edge lengths Wx, Wy exceeds the threshold value range, the output selecting section 60 sends the polygon data to the polygon dividing section 44, and when both of the edge lengths Wx, Wy fall within the threshold value range, the output selecting section 60 sends the polygon data to the pixel converting section 45.

if((Wx>range)|(Wy>range))

polygon dividing section ( ); else
pixel converting section ( ) (7)

The circuit constitution of the area size comparing section 43 can be extremely simple while containing a size comparator, difference calculator and switches, so that such circuit can readily be build up to a parallel constitution without causing a significant increase in the cost or expansion of the circuit constitution. Such area size comparing section 43 having a parallel constitution can incompetently process the polygon data received from the polygon setup section 41 and the divided polygon data received from the polygon dividing section 44, and can thus successfully avoid a situation that newly fed polygon data is queued unprocessed.

Detailed Operations and Constitution of Polygon Dividing Section

The operations and constitution of the polygon dividing section 44 shown in FIG. 2 will be explained with reference to FIGS. 5 to 8.

Figure 5:
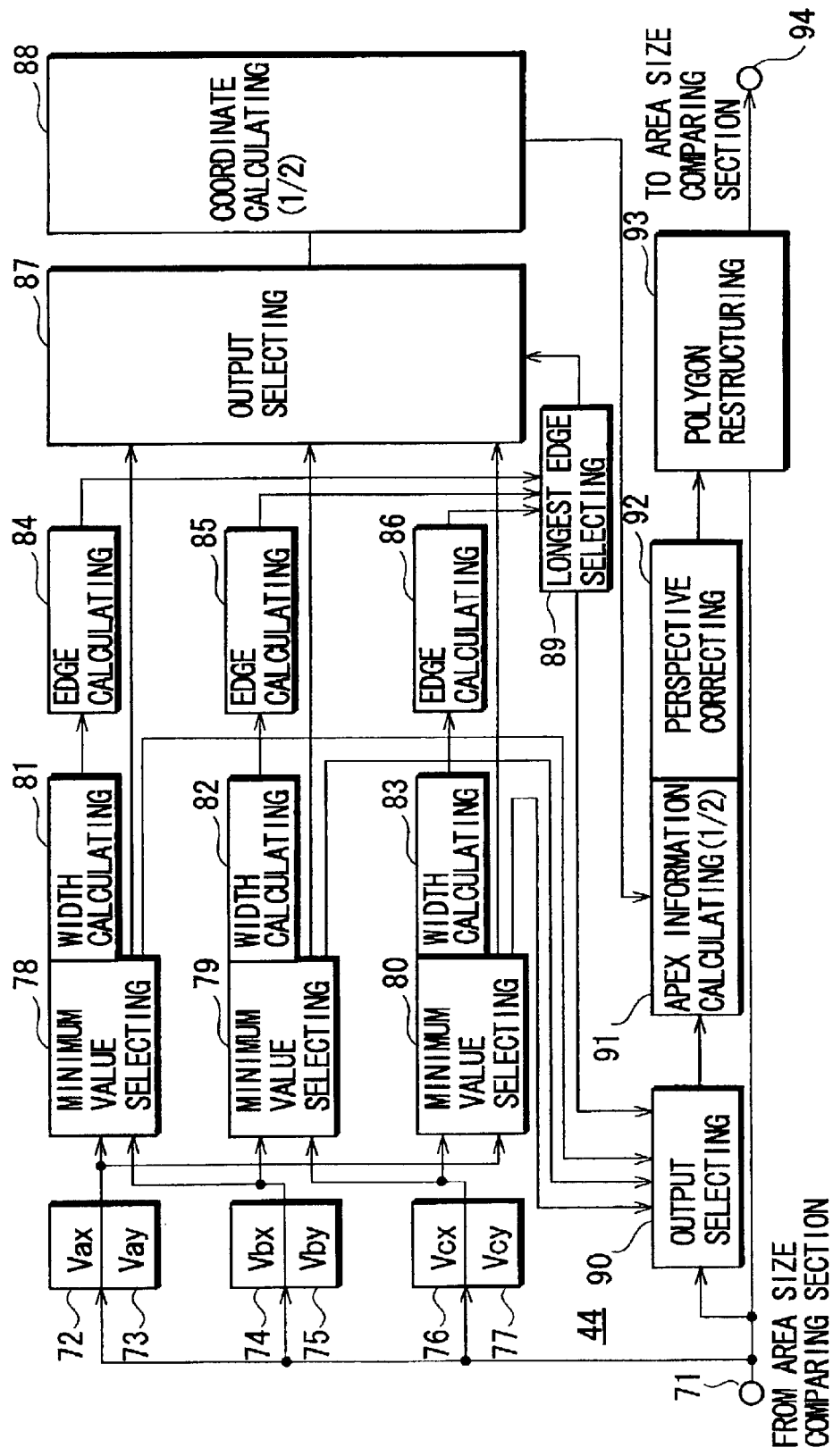
FIG. 5 is a block diagram explaining a polygon division process.

As shown in FIG. 5, an input section 71 of the polygon dividing section 44 will have an input of the polygon data received from the area size comparing section 43. The input polygon data is then sent to apex coordinate sections 72 to 77, an output selecting section 90 and a polygon restructuring section 93.

The apex coordinate section 72 mainly comprising resistors retrieves the x coordinate value Vax of apex coordinate value Va(Vax, Vay) from the individual apex coordinate values Va(Vax, Vay), Vb(Vbx, Vby) and Vc(Vcx, Vcy). The apex coordinate section 73 retrieves the y coordinate value Vay of apex coordinate value Va(Vax, Vay). The apex coordinate section 74 retrieves the x coordinate value Vbx of apex coordinate value Vb(Vbx, Vby). The apex coordinate section 75 retrieves the y coordinate value Vby of apex coordinate value Vb(Vbx, Vby). The apex coordinate section 76 retrieves the x coordinate value Vcx of apex coordinate value Vc(Vcx, Vcy). The apex coordinate section 77 retrieves the y coordinate value Vcy of apex coordinate value Vc(Vcx, Vcy). The x coordinate value Vax retrieved by the apex coordinate section 72 is sent to minimum value selecting sections 78, 80. The y coordinate value Vay retrieved by the apex coordinate section 73 is also sent to the minimum value selecting sections 78, 80. The x coordinate value Vbx retrieved by the apex coordinate section 74 is sent to minimum value selecting sections 78, 79. The y coordinate value Vby retrieved by the apex coordinate section 75 is also sent to the minimum value selecting sections 78, 79. The x coordinate value Vcx retrieved by the apex coordinate section 76 is sent to minimum value selecting sections 79, 80. The y coordinate value Vcy retrieved by the apex coordinate section 77 is also sent to the minimum value selecting sections 79, 80.

The minimum value selecting section 78 selects the smaller of x coordinate values Vax, Vbx received from the apex coordinate sections 72, 74, respectively, and also selects the smaller of y coordinate values Vay, Vby received from the apex coordinate sections 73, 75, respectively. The minimum value selecting section 79 selects the smaller of x coordinate values Vbx, Vcx respectively received from the apex coordinate sections 74, 76, respectively, and also selects the smaller of y coordinate values Vby, Vcy received from the apex coordinate sections 75, 77, respectively. The minimum value selecting section 80 selects the smaller of x coordinate values Vax, Vcx received from the apex coordinate sections 72, 76, respectively, and also selects the smaller of y coordinate values Vay, Vcy received from the apex coordinate sections 73, 77, respectively. In the example shown in FIG. 6, the minimum value selecting section 78 selects x coordinate value Vax and y coordinate value Vby, the minimum value selecting section 79 selects x coordinate value Vbx and y coordinate value Vby, and the minimum value selecting section 80 selects x coordinate value Vax and y coordinate value Vcy.

The minimum value selecting section 78 sends the individual x and y coordinate values received from the preceding apex coordinate sections 72, 73, 74, 75 directly to output selecting sections 87, 90 and to a width calculating section 81, and also sends information indicating which coordinate value was selected to such width calculating section 81. The minimum value selecting section 79 sends the individual x and y coordinate values received from the preceding apex coordinate sections 74, 75, 76, 77 directly to output selecting sections 87, 90 and to a width calculating section 82, and also sends information indicating which coordinate value was selected to such width calculating section 82. The minimum value selecting section 80 sends the individual x and y coordinate values received from the preceding apex coordinate sections 72, 73, 76, 77 directly to output selecting sections 87, 90 and to a width calculating section 83, and also sends information indicating which coordinate value was selected to such width calculating section 83.

Figure 6:
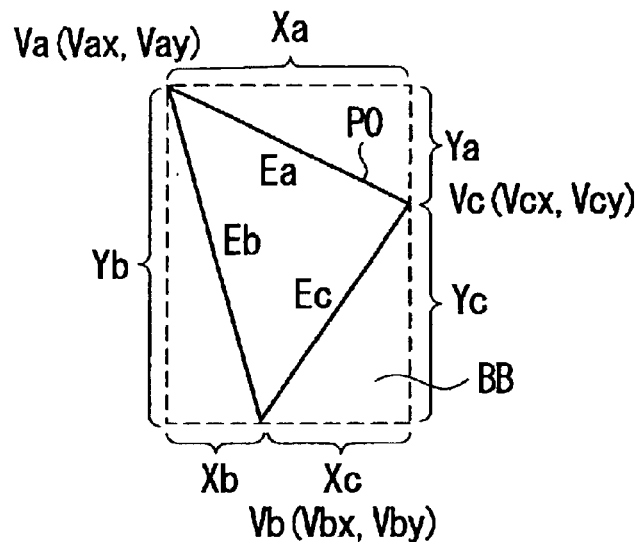
FIG. 6 is a drawing showing an example of a triangular polygon used for explaining the polygon division process.

The width calculating section 81 finds width Xb shown in FIG. 6 by subtracting x coordinate value Vax selected by the minimum value selecting section 78 from x coordinate value Vbx, and also finds width Yb by subtracting y coordinate value Vby selected by the minimum value selecting section 78 from y coordinate value Vay. The width calculating section 82 finds width Xc shown in FIG. 6 by subtracting x coordinate value Vbx selected by the minimum value selecting section 79 from x coordinate value Vcx, and also finds width Yc by subtracting y coordinate value Vby selected by the minimum value selecting section 79 from y coordinate value Vcy. The width calculating section 83 finds width Xa shown in FIG. 6 by subtracting x coordinate value Vax selected by the minimum value selecting section 80 from x coordinate value Vcx, and also finds width Ya by subtracting y coordinate value Vcy selected by the minimum value selecting section 80 from y coordinate value Vay. That is, the minimum value selection sections 78 to 80 individually select smaller values so that the associated width calculating sections 81 to 83 will not give negative values. The width calculating section 81 sends the widths Xb and Yb to an edge calculating section 84. The width calculating section 82 sends the widths Xc and Yc to an edge calculating section 85. The width calculating section 83 sends the widths Xa and Ya to an edge calculating section 86.

The edge calculating sections 84 to 86 determine each edge of the triangular polygon P0 simply by adding the widths Xb and Yb, the widths Xc and Yc, and the widths Xa and Ya. More specifically, the edge calculating section 84 finds, according to equation (8) below, an edge Eb of the triangular polygon P0 shown in FIG. 6 using the widths Xb and Yb obtained by the width calculating section 81.

$$Eb = Xb + Yb \quad (8)$$

The edge calculating section 85 finds, according to equation (9) below, an edge Ec shown in FIG. 6 using the widths Xc and Yc obtained by the width calculating section 82.

$$Ec = Xc + Yc \quad (9)$$

Similarly, the edge calculating section 86 finds, according to equation (10) below, an edge Ea shown in FIG. 6 using the widths Xa and Ya obtained by the width calculating section 83.

$$Ea = Xa + Ya \quad (10)$$

The edges Eb, Ec, Ea obtained by the edge calculating sections 84 to 86, respectively, are then sent to a longest edge selecting section 89.

The longest edge selecting section 89 selects the longest edge from the edges Eb, Ec, Ea obtained by the edge calculating sections 84 to 86, respectively, and generates a control signal used for output selection in the output selecting sections 87, 90. In the example shown in FIG. 6, the longest edge selecting section 89 selects the edge Eb.

In a particular embodiment, the longest edge of a triangular polygon is determined by the following method. Three triangles are generated. Two of each triangle's legs define a right-angled apex, and one of the three edges of the triangular polygon defines the hypotenuse opposite the right-angled apex of the triangle. A sum of the lengths of the two legs is determined for each of the three triangles. The one triangle of the three triangles which has the largest sum is selected, and the hypotenuse of the selected triangle is assigned as the longest one of the three edges.

The output selecting section 87 selects and outputs the apex coordinate values Va(Vax, Vay) and Vb(Vbx, Vby) composing the longest edge Eb from the individual x and y coordinate values supplied from the minimum value selecting sections 78 to 80. The apex coordinate values Va(Vax, Vay), and Vb(Vbx, Vby) output from the output selecting section 87 are then sent to the coordinate calculating section 88.

The coordinate calculating section 88 finds a middle point coordinate value Vd(Vdx, Vdy) between Va(Vax, Vay) and Vb(Vbx, Vby) obtained from the output selecting section 87, and then sends such middle point coordinate value Vd(Vdx, Vdy) to an apex information calculating section 91. The coordinate calculating section 88 herein finds the middle point coordinate value by shifting a coordinate value expressed by a plurality of bit values rightward by one bit.

The output selecting section 90 selects, from the polygon data received from the input section 71, a parameter corresponding to the apex coordinate values Va(Vax, Vay) and Vb(Vbx, Vby) based on the individual x and y coordinate values supplied from the minimum value selecting sections 78 to 80 and on the control signal received from the longest edge selecting section 89. The selected parameter corresponding to the apex coordinate values Va(Vax, Vay) and Vb(Vbx, Vby) is sent to the apex information calculating section 91.

Figure 7:
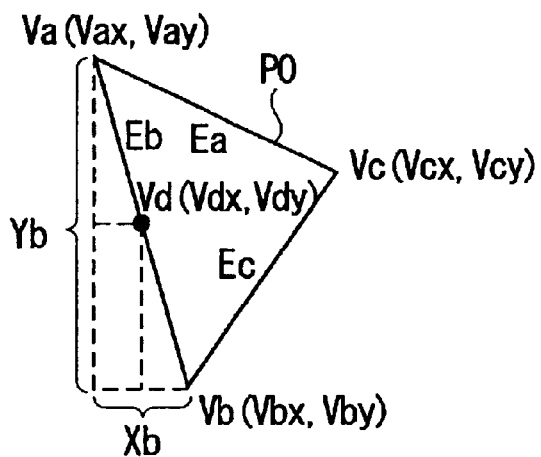
FIG. 7 is a drawing for explaining the longest edge and the middle point thereof of a triangular polygon.

The apex information calculating section 91 finds, as shown in FIG. 7, a middle point parameter corresponding to the apex coordinate values Va(Vax, Vay) and Vb(Vbx, Vby) obtained from the output selecting section 90, and then sends such middle point parameter to a perspective correcting section 92.

The perspective correcting section 92 corrects such middle point parameter using a z value, and sends the corrected parameter to the polygon restructuring section 93.

Figure 8:
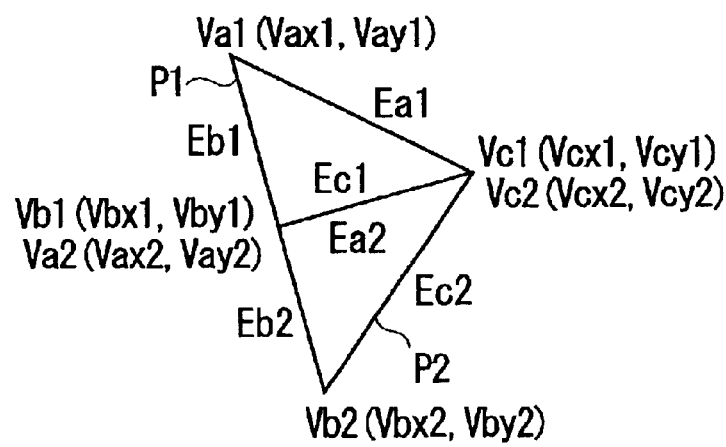
FIG. 8 is a drawing for explaining divided polygons.

The polygon restructuring section 93 constructs halved polygons P1 and P2 as shown in FIG. 8 using the polygon data supplied through the input section 71 and the corrected parameter supplied from the perspective correcting section 92. That is, the polygons P1 and P2 as shown in FIG. 8 are produced by dividing the polygon P0 shown in FIG. 6 with a line segment connecting the middle point having a coordinate value of Vd(Vdx, Vdy) on the longest edge Eb and the apex having a coordinate value of Vc(Vcx, Vcy). The polygons P1 and P2 are sent through an output section 94 back to the area size comparing section 43.

If the polygons P1 and P2 are determined by the area size comparing section 43 to still exceed the calculation range, the polygons P1 and P2 are input again to the input section 71. In this case, the polygon P1 will have apex coordinate values of Va1(Vax1, Vay1), Vb1(Vbx1, Vby1) and Vc1

(Vcx1, Vcy1), and edges Ea1, Eb1 and Ec1, which will then be subjected to the foregoing processing. On the other hand, the polygon P2 will have apex coordinate values of Va2 (Vax2, Vay2), Vb2(Vbx2, Vby2) and Vc2(Vcx2, Vcy2), and edges Ea2, Eb2 and Ec2, which will then be subjected to the foregoing processing.

Thus, the pixel calculating section 42 repeatedly executes the polygon division to thereby finally obtain polygons which fall within the calculation range.

As has been described in the above, the polygon dividing section 44 carries out the polygon division by selecting the longest edge from three edges (edges Eb, Ec and Ea in FIG. 6) of a triangular polygon, and connecting a middle point on the longest edge and an apex opposed thereto so as to produce a new edge, thereby generating two polygons holding such new edge in common. The pixel calculating section 42 repeatedly conducts the polygon division for polygons whose size exceeds the calculation range of pixel converting section 45. According to this process, the size of triangular polygons that exceed the calculation range can be reduced in a stepwise manner and the lengths of their three edges would become about equal. As a result, the sizes of the triangular polygons converge to a size suitable for the calculation range of the pixel converting section and for the most efficient processing. In other words, the polygons obtained by repeated dividing can utilize the calculation range of pixel converting section 45 almost efficiently. In the present embodiment, as all of the triangular polygons are divided to be as small as possible (or divided so that the lengths of the three edges become about equal), the number of times the polygon division (number of times of division for large polygons) is repeated until the size of the polygons fall within the calculation range (process bit length) of the pixel conversion section 45 can be expressed as (bit length of apex of initial polygon−process bit length of pixel converting section)×2 at most. The polygon halving can be conducted by a circuit configuration containing a calcula based either on fixed-point arithmetic or floating-point arithmetic, which can be realized in a most simple manner. While the number of times of division will increase with the size of the initially-fed polygon, the number of such large polygons is small by nature, so that the overall process time will not be affected.

As has been described in the above, the configuration shown in FIG. 2 limits the calculation range (process bit length) of the pixel converting section 45, whereby polygons which fall within the calculation range are directly processed by the pixel converting section 45, and polygons exceeding such calculation range are processed by the pixel converting section 45 only after being repeatedly divided in the polygon dividing section 44 so as to fall within the calculation range. In other words, the arrangement shown in FIG. 2 converges the size of triangular polygons to the calculation range of pixel conversion in pixel calculating section 42 by dividing repeatedly and performs the processing in a parallel manner in pixel converting section 45. The arrangement shown in FIG. 2 thus can convert polygons of any size, and ensures efficient, unwasteful and high-speed pixel conversion, which raises the pixel fill rate.

In the case there is no difference between the calculation ranges for the pixel conversion in the x- and y-axis directions, it is confirmed by actual calculation simulation that pixel conversion of triangular polygons whose three edges have lengths which were made almost equal by repeated dividing as mentioned above is desirable for efficient processing.

Specific Application

Figure 1:
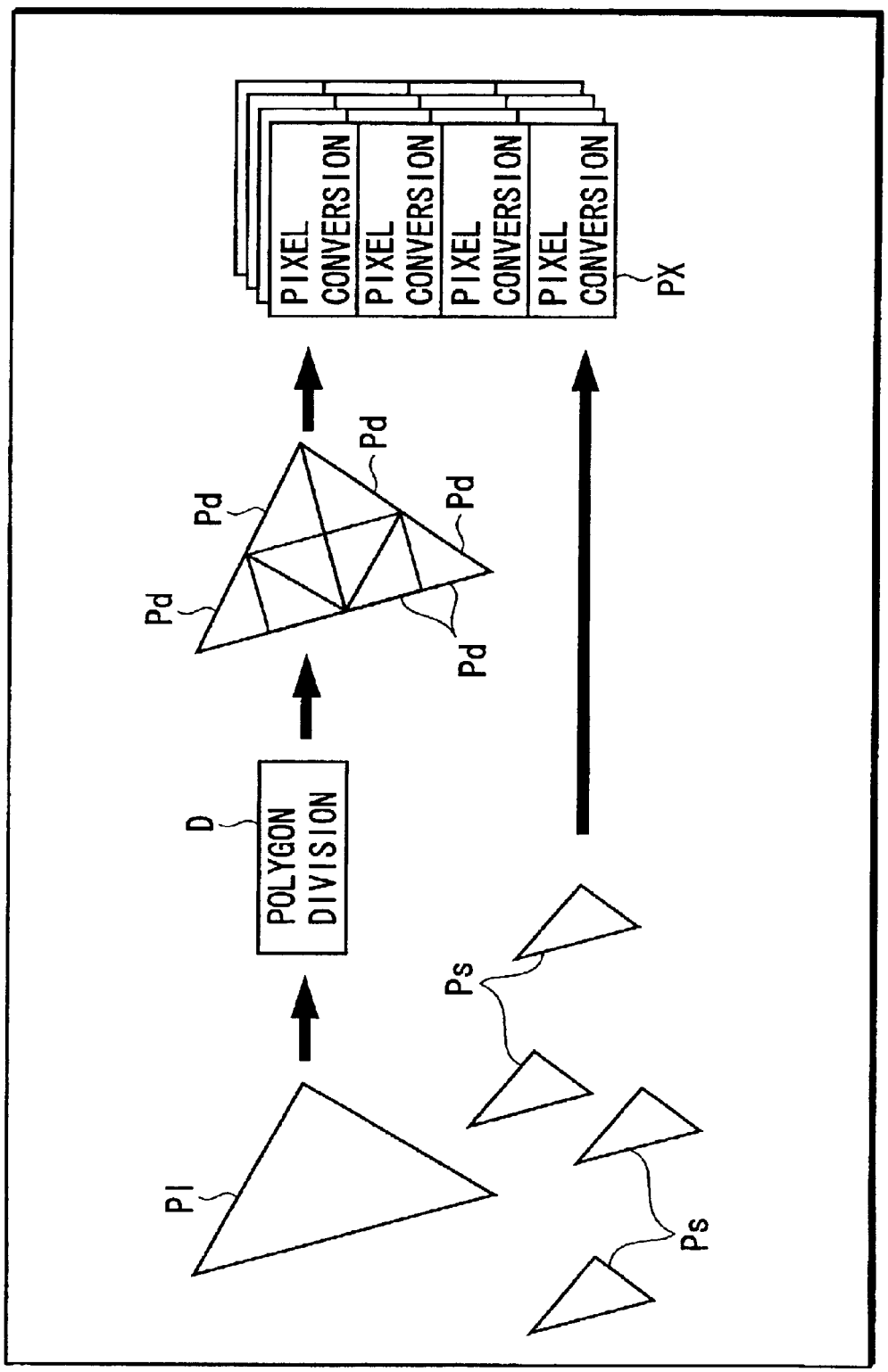
FIG. 1 is a schematic diagram explaining the concept of pixel conversion.

The pixel conversion shown in FIG. 1 is typically applicable to image processing carried out by a graphic processor unit (GPU) 101 of a video game console shown in FIG. 9.

The video game console shown in FIG. 9 comprises a main CPU 100, the graphic processor unit (GPU) 101, an I/O processor (IOP) 104, an optical disk reproducing section 112, a main memory 105, a MASK-ROM 106 and a sound processor unit (SPU) 108. The main CPU 100 is responsible for controlling signal processing and internal components based on various programs, such as a game application program for materializing a video game. The GPU 101 is responsible for image processing including the foregoing pixel conversion. The IOP 104 is responsible for processing for interfacing external devices with the internal devices of the game console and ensuring greater compatibility. The optical disk reproducing section 112 is responsible for reproducing optical disks, such as DVDs and CDs having stored therein application programs and multimedia data. The main memory 105 functions as a work area for the main CPU 100 or as a buffer temporarily storing data read out from an optical disk. The MASK-ROM 106 mainly stores an operating system program executed by the main CPU 100 and I/O processor 104. The SPU 108 is responsible for sound signal processing.

The video game console is also provided with a digital signal processor (DSP) 110, a driver 111, a mechanical controller 109 and a card-type connector (PC card slot) 107. The DSP 110 reproduces (decodes) data recorded in a CD or DVD by subjecting a disk reproduction signal, which is read out from the CD or DVD by the disk reproducing section 112 and amplified by an RF amplifier 113, to error correction (CIRC processing) and expansion decoding. The driver 111 and mechanical controller 109 are responsible for controlling the rotation of a spindle motor of the optical disk reproducing section 112, focus/tracking control of an optical pickup, and loading of a disk tray. The card-type connector 107 is a connection port of a communication card, external hard disk drive and so forth.

These sections are connected with each other mainly through bus lines 102, 103. The main CPU 100 and GPU 101 are connected with a dedicated bus. The main CPU 100 and IOP 104 are connected with an SBUS. Connection of the IOP 104 with the DSP 110, MASK-ROM 106, sound processor unit 108 and card-type connector 107 are accomplished by SSBUS.

The main CPU 100 controls the entire operation of the video game console by executing the operating system program for the main CPU stored in the MASK-ROM 106. The main CPU 100 also controls game operations by executing a game application program loaded into the main memory 105 after being read out from optical disks, such as a CD-ROM or DVD-ROM, or downloaded through a communication network.

The IOP 104 controls input/output of signals received from a controller 20 in response to operations by a game player, input/output of data to or from a memory card 26 storing various settings for the game, and input/output to or from a USB terminal 5, an IEEE 1394 terminal 6, a PC card slot (not shown) or the like.

The GPU 101 functions as a geometry transfer engine responsible for coordinate conversion and as a rendering processor which performs drawing, including pixel conversion, as instructed by the main CPU 105, and stores drawn images in a frame buffer, not shown. In a typical case in which an application program stored in an optical disk uses a so-called three-dimensional (3D) graphic, such as a video game, the GPU 101 performs geometry calculation to thereby calculate the coordinates of polygons for composing a three-dimensional object, then performs rendering to thereby effect transparent conversion which involves various calculations for generating an image possibly obtained by photographing such three-dimensional object with a virtual camera, and then writes a finally obtained image in the frame buffer. The GPU 101 outputs video signals corresponding to the thus produced image.

The SPU 108 has functions for ADPCM (adaptive differential pulse code modulation) decoding, audio signal reproduction and signal modulation. The ADPCM decoding refers to a function for decoding sound data coded by adaptive predictive coding. The audio signal reproduction refers to a function for reading out sound waveform data stored in a built-in or attached sound buffer, not shown, to thereby reproduce and output audio signals such as effective sound. The signal modulation refers to a function for generating various sound waveform data by modulating waveform data stored in the sound buffer. In other words, the SPU 108 also functions as a so-called sampling sound source that can generate audio signals, such as music sound or effective sound, from waveform data stored in the sound buffer.

When such composed video game console is powered ON, operating system programs for the main CPU and IOP are read out from the MASK-ROM 106. The main CPU 100 and IOP 104 respectively execute the corresponding operating system programs. The main CPU 100 thus generally controls individual sections of the video game console. The IOP 104 controls input/output to or from the controller 20, memory card 26, and so forth. The main CPU 100 executes the operating system program to thereby effect initialization, such as operational confirmation; controls the optical disk reproducing section 112 so as to read out an application program, such as those for games stored in an optical disk; loads the application program into the main memory 105; and executes such program. While executing such game application program, the main CPU 100 controls the GPU 101 and SPU 108 in response to instructions issued by the game player and received from the controller 20 through the IOP 104, thereby controlling the display of images and the generation of effective sound and music sound.

Although the invention herein has been described with reference to particular embodiments, it is to be understood that these embodiments are merely illustrative of the principles and applications of the present invention. For example, the polygon division is not limited to halving, and division into three or more polygons is also allowable. Such technique of polygon division will successfully reduce the number of times the division will have to be repeated. Further, when the polygon has more than four apexes, the image processing device according to the present embodiment may generate triangular polygons by dividing the polygon and performing processing such as threshold comparing processing or repeated dividing processing against the triangular polygon. It is therefore to be understood that numerous modifications may be made to the illustrative embodiments and that other arrangements may be devised without departing from the spirit and scope of the present invention as defined by the appended claims.

What is claimed is:

1. An image processing method, comprising:
   (a) retrieving data representing triangular polygons, the polygons defining an object for a purpose of computer graphics processing, each of the polygons having three edges, the three edges defining a size of each polygon;
   (b) comparing the size of each of the polygons represented by the retrieved data with a predetermined threshold value to identify a first set of the polygons in which the size exceeds the threshold value and a second set of the polygons in which the size does not exceed the threshold value;
   (c) for each of the polygons in the first set, detecting a longest one of the three edges;
   (d) dividing each of the polygons in the first set with a line segment connecting a predetermined point on the longest one of the three edges to an apex opposite the longest one of the three edges to form divided polygons;
   (e) comparing the size of each of the divided polygons with a predetermined threshold value to identify a first set of the divided polygons in which the size exceeds the threshold value and a second set of the divided polygons in which the size does not exceed the threshold value;
   (f) for each of the divided polygons in the first set, detecting a longest one of the three edges;
   (g) further dividing each of the divided polygons in the first set with a line segment connecting a predetermined point on the longest one of the three edges to an apex opposite the longest one of the three edges;
   (h) thereafter repeating the comparing step, the detecting step and the further dividing step in order with respect to the divided polygons obtained by the further dividing step until there are no divided polygons for which the size exceeds the threshold value, such that the lengths of the three edges of each divided polygon become approximately equal; and
   (i) converting each of the polygons in the second set of polygons and each of the divided polygons in the second set of divided polygons into pixels.

2. The image processing method according to claim 1, wherein the detecting step includes:
   generating three triangles each having two legs defining a right-angled apex, wherein one of the three edges of the triangular polygon defines a hypotenuse opposite the right-angled apex of the triangle;
   for each of the three triangles, determining a sum of the lengths of the two legs;
   selecting one of the three triangles having the largest sum; and
   assigning the hypotenuse of the selected triangle as the longest one of the three edges.

3. The image processing method according to claim 1, wherein the predetermined point is a middle point of the longest one of the three edges.

4. The image processing method according to claim 1, wherein the converting step converts each of the polygons in the second set into pixels by parallel processing.

5. An image processing device, comprising:
   a retrieving section operable to retrieve data representing triangular polygons, the polygons defining an object for a purpose of computer graphics processing, each of the polygons having three edges, the three edges defining a size of each polygon;
   a comparing section operable to compare the size of each of the polygons represented by the retrieved data with a predetermined threshold value to identify a first set of the polygons in which the size exceeds the threshold value and a second set of the polygons in which the size does not exceed the threshold value;
   a detecting section operable to detect a longest one of the three edges for each of the polygons in the first set, and to divide each of the polygons in the first set with a line segment connecting a predetermined point on the longest one of the three edges to an apex opposite to the longest one of the three edges to form divided polygons, wherein the comparing section is further operable to compare the size of the divided polygons to identify a first set of the divided polygons in which the size exceeds the threshold value and a second set of the divided polygons in which the size does not exceed the threshold value and the detecting section is further operable to detect the longest one of the three edges of each of the divided polygons in the first set and to further divide each of the divided polygons in the first set with a line segment connecting a predetermined point on the longest one of the three edges, and to continue the detecting of the longest one of the three edges and the dividing of the divided polygons as long as the comparing section identifies divided polygons in the first set, such that the lengths of the three edges of each divided polygon become approximately equal; and a converting section operable to convert each of the polygons in the second set of polygons and each of the divided polygons in the second set of divided polygons into pixels.

6. A computer-readable recording medium having stored thereon an image processing program to be executed for performing an image processing method on a computer, the method comprising:

(a) retrieving data representing triangular polygons, the polygons defining an object for a purpose of computer graphics processing, each of the polygons having three edges, the three edges defining a size of each polygon;

(b) comparing the size of each of the polygons represented by the retrieved data with a predetermined threshold value to identify a first set of the polygons in which the size exceeds the threshold value and a second set of the polygons in which the size does not exceed the threshold value;

(c) for each of the polygons in the first set, detecting a longest one of the three edges;

(d) dividing each of the polygons in the first set with a line segment connecting a predetermined point on the longest one of the three edges to an apex opposite the longest one of the three edges to form divided polygons;

(e) comparing the size of each of the divided polygons with a predetermined threshold value to identify a first set of the divided polygons in which the size exceeds the threshold value and a second set of the divided polygons in which the size does not exceed the threshold value;

(f) for each of the divided polygons in the first set, detecting a longest one of the three edges;

(g) further dividing each of the divided polygons in the first set with a line segment connecting a predetermined point on the longest one of the three edges to an apex opposite the longest one of the three edges;

(h) thereafter repeating the comparing step, the detecting step and the further dividing step in order with respect to the divided polygons obtained by the further dividing step until there are no divided polygons for which the size exceeds the threshold value, such that the lengths of the three edges of each divided polygon become approximately equal; and (i) converting each of the polygons in the second set of polygons and each of the divided polygons in the second set of divided polygons into pixels.

7. A system for image processing, comprising:

a processor operable to execute instructions; and instructions executable by the processor for performing an image processing method, the method including:

retrieving data representing triangular polygons, the polygons defining an object for a purpose of computer graphics processing, each of the polygons having three edges, the three edges defining a size of each polygon;

comparing the size of each of the polygons represented by the retrieved data with a predetermined threshold value to identify a first set of the polygons in which the size exceeds the threshold value and a second set of the polygons in which the size does not exceed the threshold value;

dividing each of the polygons in the first set once to form divided polygons;

comparing the size of each of the divided polygons to identify a first set of the divided polygons in which the size exceeds the threshold value;

further dividing each of the divided polygons in the first set once;

thereafter repeating the comparing step, the detecting step and the further dividing step in order with respect to the divided polygons obtained by the further dividing step until there are no divided polygons for which the size exceeds the threshold value, such that the lengths of the three edges of each divided polygon become approximately equal;

and converting each of the polygons in the second set of polygons and each of the divided polygons in the second set of divided polygons into pixels.

8. A system for image processing, comprising:

a processor operable to execute instructions; and instructions executable by the processor for performing an image processing method, the method including:

(a) retrieving data representing triangular polygons, the polygons defining an object for a purpose of computer graphics processing, each of the polygons having three edges, the three edges defining a size of each polygon;

(b) comparing the size of each of the polygons represented by the retrieved data with a predetermined threshold value to identify a first set of the polygons in which the size exceeds the threshold value and a second set of the polygons in which the size does not exceed the threshold value;

(c) for each of the polygons in the first set, detecting a longest one of the three edges;

(d) dividing each of the polygons in the first set with a line segment connecting a predetermined point on the longest one of the three edges to an apex opposite the longest one of the three edges to form divided polygons;

(e) for each of the divided polygons, comparing the size of each of the divided polygons with a predetermined threshold value to identify a first set of the divided polygons in which the size exceeds the threshold value and a second set of the divided polygons in which the size does not exceed the threshold value;

(f) for each of the divided polygons in the first set, detecting a longest one of the three edges;

(g) further dividing each of the divided polygons in the first set with a line segment connecting a predetermined point on the longest one of the three edges to an apex opposite the longest one of the three edges;

(h) thereafter repeating the comparing step, the detecting step and the further dividing step in order with respect to the divided polygons obtained by the further dividing step until there are no divided polygons for which the size exceeds the threshold value, such that the lengths of the three edges of each divided polygon become approximately equal; and (i) converting each of the polygons in the second set of polygons and each of the divided polygons in the second set of divided polygons into pixels.

* * * * *